(12) United States Patent
Xie et al.

(10) Patent No.: US 9,207,709 B2
(45) Date of Patent: Dec. 8, 2015

(54) STORAGE DEVICE ASSEMBLING MODULE AND ELECTRONIC APPARATUS USING THE SAME

(71) Applicant: Wistron Corporation, New Taipei (TW)

(72) Inventors: Fu-Qin Xie, New Taipei (TW); Huang-Yeh Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 364 days.

(21) Appl. No.: 13/856,796

(22) Filed: Apr. 4, 2013

(65) Prior Publication Data

US 2013/0279129 A1 Oct. 24, 2013

(30) Foreign Application Priority Data

Apr. 23, 2012 (CN) .......................... 2012 1 0121015

(51) Int. Cl.
*G06F 1/16* (2006.01)
*G06F 1/18* (2006.01)

(52) U.S. Cl.
CPC *G06F 1/16* (2013.01); *G06F 1/187* (2013.01); *Y10T 29/53174* (2015.01)

(58) Field of Classification Search
CPC ........................................................ G06F 1/16
USPC ................ 361/728–747, 752–759, 796–802, 361/805–837; 29/739
See application file for complete search history.

(56) References Cited

U.S. PATENT DOCUMENTS

| | | | | |
|---|---|---|---|---|
| 4,941,841 | A * | 7/1990 | Darden et al. | 361/679.39 |
| 5,216,582 | A * | 6/1993 | Russell et al. | 361/679.34 |
| 5,325,263 | A * | 6/1994 | Singer et al. | 361/679.39 |
| 5,340,340 | A * | 8/1994 | Hastings et al. | 439/64 |
| 5,519,571 | A * | 5/1996 | Shieh | 361/679.37 |
| 5,673,171 | A * | 9/1997 | Varghese et al. | 361/679.34 |
| 5,784,644 | A * | 7/1998 | Larabell | 710/9 |
| RE35,915 | E * | 10/1998 | Hastings et al. | 439/377 |
| 6,257,682 | B1 * | 7/2001 | Liu et al. | 312/223.2 |
| 6,288,902 | B1 * | 9/2001 | Kim et al. | 361/725 |

(Continued)

FOREIGN PATENT DOCUMENTS

| | | |
|---|---|---|
| TW | M286444 U | 1/2006 |
| TW | M353460 U | 3/2009 |

(Continued)

*Primary Examiner* — Courtney Smith
*Assistant Examiner* — Rashen E Morrison
(74) *Attorney, Agent, or Firm* — Muncy, Geissler, Olds & Lowe, P.C.

(57) ABSTRACT

A storage device assembling module for assembling a storage device in an electronic apparatus includes a main frame, an adapter, and at least one handgrip. The main frame includes a chute forming a receiving space for receiving the storage device and positioning. The adapter is combined with the main frame and includes a first connecting port connected electrically to the storage device and a second connecting port connected electrically to a circuit board. The location of the first connecting port is closed to the chute, and the connecting direction of the first connecting port is substantially perpendicular to the connecting direction of the second connecting port. Each handgrip is connected pivotally to at least one side of the main frame which is away from the circuit board. The storage device assembling module can substantially be perpendicularly detached from the circuit board by pulling the at least one handgrip.

22 Claims, 12 Drawing Sheets

(56) References Cited

U.S. PATENT DOCUMENTS

| | | | |
|---|---|---|---|
| 6,317,317 B1* | 11/2001 | Lu et al. | 361/679.33 |
| 6,560,099 B1* | 5/2003 | Chang | 361/679.4 |
| 6,798,651 B2* | 9/2004 | Syring et al. | 361/679.34 |
| 6,999,308 B2* | 2/2006 | Hsu | 361/679.33 |
| 7,031,150 B2* | 4/2006 | Chen et al. | 361/679.33 |
| 7,042,710 B1* | 5/2006 | Beseth et al. | 361/679.01 |
| 7,155,730 B2* | 12/2006 | Hsu et al. | 720/600 |
| 7,248,468 B1* | 7/2007 | Hsu | 361/679.33 |
| 7,523,901 B2* | 4/2009 | Wu et al. | 248/225.21 |
| 7,576,979 B1* | 8/2009 | Dearborn et al. | 361/679.38 |
| 7,576,984 B2* | 8/2009 | Chen et al. | 361/679.33 |
| 7,679,896 B2* | 3/2010 | Deng et al. | 361/679.33 |
| 7,969,729 B2* | 6/2011 | Yang | 361/679.54 |
| 7,995,337 B2* | 8/2011 | Kuo | 361/679.34 |
| 8,070,125 B2* | 12/2011 | Sun | 248/560 |
| 8,289,693 B2* | 10/2012 | Li | 361/679.34 |
| 8,369,080 B2* | 2/2013 | Huang | 361/679.38 |
| 8,908,327 B1* | 12/2014 | Li | 360/99.17 |
| 8,964,371 B2* | 2/2015 | Hou et al. | 361/679.37 |
| 2003/0193775 A1* | 10/2003 | Chang | 361/685 |
| 2005/0195563 A1* | 9/2005 | Chung | 361/685 |
| 2006/0034048 A1* | 2/2006 | Xu | 361/685 |
| 2006/0120170 A1* | 6/2006 | Chen et al. | 365/189.05 |
| 2007/0025014 A1* | 2/2007 | Kim | 360/97.01 |
| 2007/0042647 A1* | 2/2007 | Chuang | 439/620.29 |
| 2007/0137369 A1* | 6/2007 | Hsu | 74/489 |
| 2008/0057781 A1* | 3/2008 | Chen et al. | 439/577 |
| 2008/0305687 A1* | 12/2008 | Zhang et al. | 439/638 |
| 2008/0310095 A1* | 12/2008 | Chiang et al. | 361/685 |
| 2009/0046437 A1* | 2/2009 | Hsieh et al. | 361/752 |
| 2009/0059506 A1* | 3/2009 | Yeh et al. | 361/685 |
| 2009/0296338 A1* | 12/2009 | Peng et al. | 361/679.31 |
| 2010/0009573 A1* | 1/2010 | Ting | 439/630 |
| 2010/0039766 A1* | 2/2010 | Chiang et al. | 361/679.34 |
| 2010/0101285 A1* | 4/2010 | Hsu | 70/58 |
| 2010/0165564 A1* | 7/2010 | Lu | 361/679.35 |
| 2011/0134598 A1* | 6/2011 | Hsiao | 361/679.33 |
| 2011/0134599 A1* | 6/2011 | Li | 361/679.34 |
| 2011/0210220 A1* | 9/2011 | Peng et al. | 248/311.2 |
| 2012/0026656 A1* | 2/2012 | Lee et al. | 361/679.01 |
| 2012/0050974 A1* | 3/2012 | Chen et al. | 361/679.21 |
| 2012/0051010 A1* | 3/2012 | Chen | 361/752 |
| 2012/0104222 A1* | 5/2012 | Ding | 248/634 |
| 2012/0162956 A1* | 6/2012 | Gong et al. | 361/810 |
| 2012/0224334 A1* | 9/2012 | Liu | 361/748 |
| 2013/0279129 A1* | 10/2013 | Xie et al. | 361/752 |
| 2014/0016263 A1* | 1/2014 | Chang et al. | 361/679.37 |

FOREIGN PATENT DOCUMENTS

| | | |
|---|---|---|
| TW | M386574 U1 | 8/2010 |
| TW | M400180 U1 | 3/2011 |
| TW | 201112926 A1 | 4/2011 |
| TW | M403724 U1 | 5/2011 |
| TW | 201134368 A1 | 10/2011 |
| TW | 201206320 A1 | 2/2012 |

* cited by examiner

STORAGE DEVICE ASSEMBLING MODULE AND ELECTRONIC APPARATUS USING THE SAME

FIELD

The exemplary embodiment(s) of the present invention relates to a field of storage device assembling module. More specifically, the exemplary embodiment(s) of the present invention relates to a storage device assembling module for easily detaching a storage device from an electronic device.

BACKGROUND

Storage device, such as a hard disk, is a main storing medium in computer system. The hard disk is usually assembled in a computer and mostly horizontally disposed, and wires such as a power line and a cable are needed to electrically connect the hard disk to the computer. Therefore, it is a problem about how to lay out the hard disk and the related wires using limited space in the computer. When the hard disk is need to be detached for exchanging or repairing, tools have to be used to execute the detaching work in the casing of the computer, and the related wires are pulled out and then plugged in. It is not only difficult to carry out the work, but also might damage the inner device without cautiousness, thus it is not convenient for users.

Take a computer server as an example, in order to fit assembling demands of multiple computers, the length, width and height of the casing of common rack mount server are limited so as to unify the assembling specification of the inner devices. Furthermore, other objects such as power management apparatus or heat dissipating apparatus are assembled in the casing, thus the rest space for assembling the hard disk is quite restricted. Besides, if the hard disk is still electrically connected to the circuit board by the cable which needs to be plugged in/out, or even has to be fixed by screws, the assembling time and assembling complexity for the computer would be greatly increased. Accordingly, it is an important and to be solved topic about how to effectively use the space without increasing the height and width of the casing of the server, and further improve the convenience of plugging in/out the hard disk.

SUMMARY

It is a main object of the present invention to provide a storage device assembling module for easily detaching a storage device from an electronic device.

To achieve the above object, a storage device assembling module according to the present invention for assembling a storage device in an electronic apparatus to electrically connect to a circuit board of the electronic apparatus is disclosed, which comprises a main frame, an adapter, and at least one handgrip. The main frame includes a chute structure formed a receiving space for receiving the storage device and positioning. The adapter is combined with the main frame and includes a first connecting port connected electrically to the storage device and a second connecting port connected electrically to the circuit board. A location of the first connecting port is closed to the chute, and a connecting direction of the first connecting port is substantially perpendicular to a connecting direction of the second connecting port. Each handgrip is connected pivotally to at least one side of the main frame which is away from the circuit board. The storage device assembling module could be substantially perpendicularly detached from the circuit board by pulling the at least one handgrip.

In one embodiment of the present invention, the main frame further includes a plurality of apertures, each aperture includes a through hole and an extension groove communicated with the through hole, and an aperture size of the through hole is larger than a groove width of the extension groove. The storage device assembling module further comprises a plurality of engaging member corresponding to the positions of the plurality of apertures thereby being fixed on the storage device. Each engaging member includes a column body, a buffer element and a stopping portion, the column body connects to the stopping portion, and the buffer element is disposed around the column body and keeps a gap with the stopping portion. Wherein a cross-section diameter of the column body is smaller than the groove width of the extension groove, and a cross-section diameter of the stopping portion is between the aperture size of the through hole and the groove width of the extension groove.

In one embodiment of the present invention, the storage device assembling module further comprises an assistant frame, for fastening the storage device and being detachably disposed on the main frame along the chute structure. Wherein the main frame further comprises an inner guiding track structure disposed in the chute structure, and the assistant frame comprises a corresponding inner guiding track structure. When the assistant frame slips into the chute structure, the corresponding inner guiding track structure moves along the inner guiding track structure.

In one embodiment of the present invention, the assistant frame comprises at least one cushion element, which protrudes from the assistant frame toward one surface of the main frame, and a distance between the main frame and the assistant frame is increased by the at least one cushion element.

In one embodiment of the present invention, the assistant frame comprises an operation portion, and by applying force on the operation portion along a reverse direction of the assistant frame slipping into the chute structure, the assistant frame slips out of the chute structure.

An electronic apparatus of the present invention comprises a casing, at least one storage device, a circuit board and at least one storage device assembling module aforementioned. The circuit board is disposed in the casing and including at least one connector. Each storage device assembling module is substantially perpendicularly disposed on the circuit board to accommodate each storage device thereby electrically connecting each storage device to the circuit board. Each storage device assembling module comprises a main frame, an adapter, and at least one handgrip. The main frame includes a chute structure which forms a receiving space for receiving and positioning the storage device. The adapter is combined with the main frame and includes a first connecting port connected electrically to the storage device and a second connecting port connected electrically to the connector of the circuit board, a location of the first connecting port being adjacent to the chute structure. A connecting direction of the first connecting port is substantially perpendicular to a connecting direction of the second connecting port, and the connecting direction of the first connecting port is substantially parallel to the circuit board. Each handgrip is connected pivotally to at least one side of the main frame which is away from the circuit board, and the storage device assembling module could be substantially perpendicularly detached from the circuit board by pulling the at least one handgrip.

According to this design, the storage device assembling module of the present invention could being assembled vertically on the circuit board through the adapter, and further effectively saves the space inside the electronic apparatus. The storage device could be easily assembled on or detached from the storage device assembling module of the present invention, and the storage device assembling module of the present invention also could be easily assembled to/detached from the circuit board of the electronic apparatus, and thus the use of the wires could be decreased and the assembling time and assembling complexity could be reduced.

BRIEF DESCRIPTION OF THE DRAWINGS

In the drawings, wherein similar reference numerals denote similar elements throughout the several views.

DETAILED DESCRIPTION

The advantages and innovative features of the invention will become more apparent from the following detailed description when taken in conjunction with the accompanying drawings.

Figure 1:
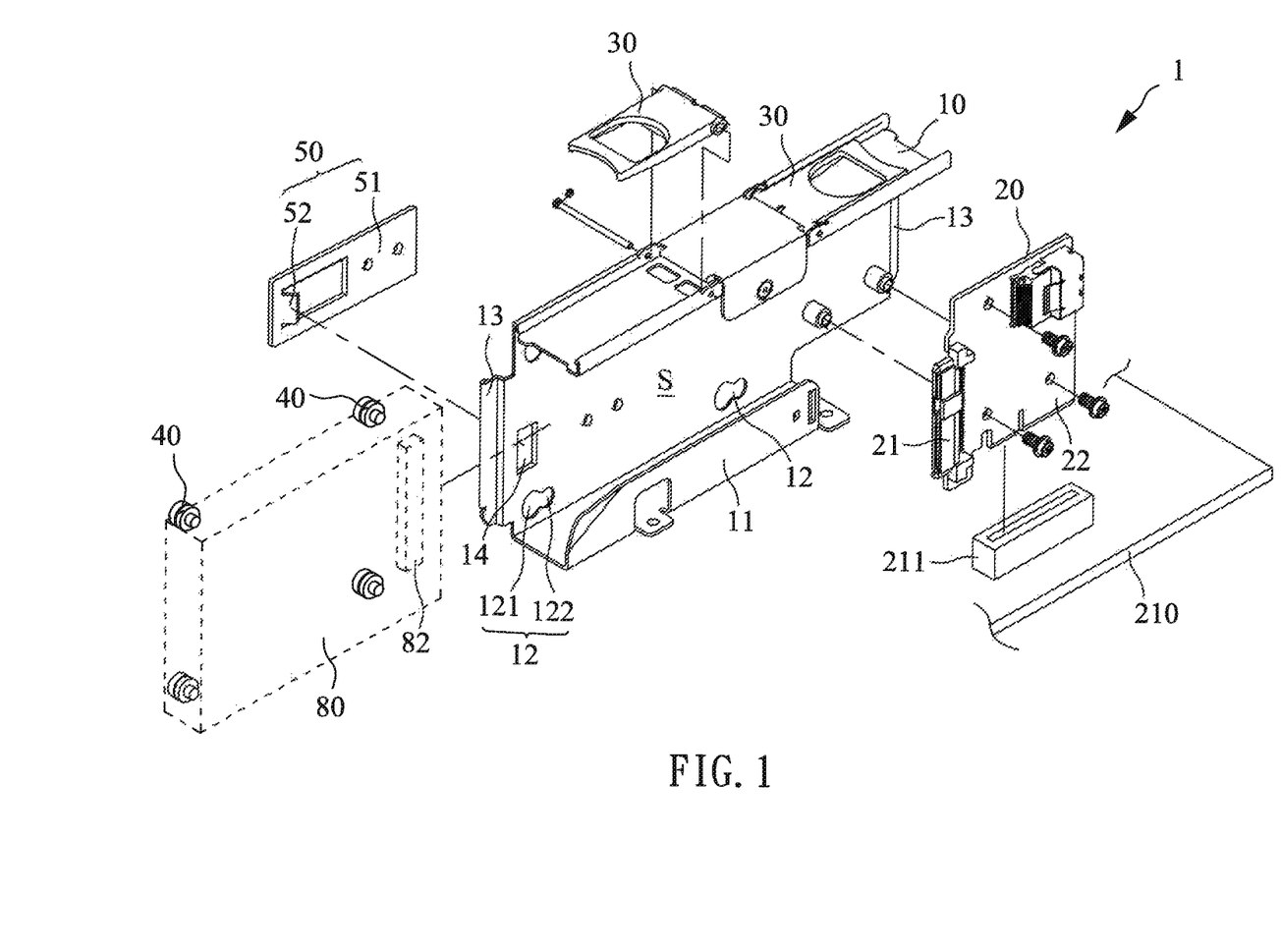
FIG. 1 is a structure explosion diagram of a first embodiment according to a storage device assembling module of the present invention.

Please refer to FIG. 1, which is a structure explosion diagram of a first embodiment according to a storage device assembling module 1 of the present invention.

The storage device assembling module of the present invention is for assembling the storage device on an electronic apparatus and electrically connecting to a circuit board of the electronic apparatus. In one embodiment of the present invention, the electronic apparatus could be a desk-top computer, a server, a work station or other electronic apparatus having similar need of disposing the storage device. However, the present invention is not limited to the examples aforementioned. The storage device of the present invention could be a hard disk or other similar storage device.

As shown in FIG. 1, the storage device assembling module 1 according to the present invention comprises a main frame 10, an adapter 20, and at least one handgrip 30. The main frame 10 includes a chute structure 11 forming a receiving space S, and the receiving space S formed by the chute structure 11 has a width approximate to the width of the storage device 80 to be disposed in, thereby providing the storage device 80 to slip into, and a positioning effect is generated by the chute structure 11, however the present invention is not limited to it. In addition, the thickness of the receiving space S is not smaller than the thickness of the storage device 80, thus the same main frame 10 could be used by storage device 80 with different thickness size. For example, a 3.5 inch hard disk or a 2.5 inch hard disk could be correspondingly disposed into the main frame 10.

The adapter 20 is combined with the main frame 10. Through the adapter 20, a signal transferring interface adapting function is provided between the storage device 80 and the circuit board 210 of the electronic apparatus. The adapter 20 includes a first connecting port 21 and a second connecting port 22. The first connecting port 21 is electrically connected to a connection interface 82 of the storage device 80, and the second connecting port 22 is electrically connected to a corresponding interface 211 of the circuit board 210. A location of the first connecting port 21 is adjacent to the chute structure 11, thus the connection interface 82 of the storage device 80 which has slipped into the chute structure 11 could directly connect to the first connecting port 21 of the adapter 20. Further, a connecting direction of the first connecting port 21 connecting to the storage device 80 is substantially perpendicular to a connecting direction of the second connecting port 22 connecting to the circuit board 210, thus a change of interface connecting direction is provided.

The at least one handgrip 30 is connected pivotally to the main frame 10, and each handgrip 30 could be rotated relative to the main frame 10. When the handgrip 30 rotates to an appropriate position and angle, a user could pull the at least one handgrip 30 and therefore pull out the main frame 10 from the electronic apparatus. The at least one handgrip 30 is connected pivotally to one side of the main frame 10 opposite to one side of the main frame 10 which the second connecting port 22 has been disposed on, or to one side of the main frame 10 which is away from and relative to the circuit board 210. In this way, the user could detach the storage device assembling module 1 of the present invention from the circuit board 210 by pulling the at least one handgrip 30 toward the direction opposite to the connection direction of the second connecting port 22 (or the circuit board 210). Therefore, each handgrip 30 could be rotated to the direction which is substantially parallel to the connection direction of the second connecting port 22 (or substantially perpendicular to the connection direction of the circuit board 210), and the user could apply force on each handgrip 30. Besides, for the user conveniently operating the handgrip 30, an elastic member such as a torsion spring could be disposed at the site where the handgrip 30 has been pivotally disposed. In such way, the handgrip 30 could return to the original position automatically, but the present invention is not limited to it.

In this embodiment, for providing the storage device 80 a fixing function on the main frame 10, the main frame 10 further includes a plurality of apertures 12, each aperture 12 includes a through hole 121 and an extension groove 122 communicated with the through hole 121. A aperture size of the through hole 121 is larger than a groove width of the extension groove 122, thereby forming a calabash-shape aperture 12, but the present invention is not limited to it.

For match up the design of the plurality of apertures 12, the storage device assembling module 1 of the present invention further comprises a plurality of engaging member 40 corresponding to positions of the plurality of apertures 12, thereby being fixed on the storage device 80, so as to provide a result of the storage device 80 being fixed on the main frame 10.

Furthermore, the storage device assembling module 1 of the present invention further comprises a positioning structure 50, and the positioning structure 50 includes a fixing portion 51 and a positioning portion 52. The fixing portion 51 connects to the main frame 10, and thus the positioning structure 50 could be fixed on the main frame 10. The positioning portion 52 penetrate a opening 14 of the main frame 10, so as to provide a positioning effect after the storage device 80 slipping into the chute structure 11. During the process of the storage device 80 slipping into the chute structure 11, the positioning portion 52 would make the positioning structure 50 swing relative to the main frame 10 by the fixing portion 51 as a fulcrum according to whether the positioning portion 52 is pushed by the storage device 80.

The positioning portion 52 is an inclined plane structure having swinging-elastic. When the storage device 80 slips into the chute structure 11, the inclined plane structure would following be pushed by the storage device 80, thereby the positioning portion 52 in the opening 14 being forced to swing toward a direction away from the main frame 10 and exits the opening 14, and the slipping operation of the storage device 80 is not affected, but the present invention is not limited to it.

Figure 2:
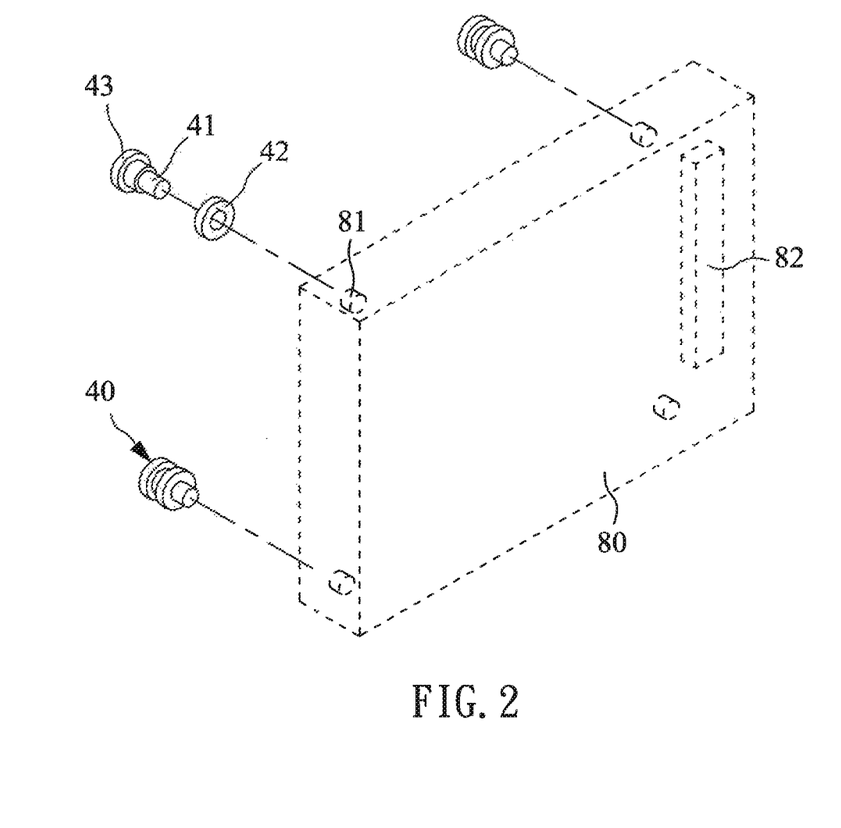
FIG. 2 is a schematic diagram of an engaging member according to the storage device assembling module of the present invention being disposed on a storage device.

Please refer to FIG. 2, which is a schematic diagram of an engaging member 40 according to the storage device assembling module 1 of the present invention being disposed on a storage device 80.

As shown in FIG. 2, each engaging member 40 includes a column body 41, a buffer element 42 and a stopping portion 43. The column body 41 is inserted into a corresponding hole 81 of the storage device 80. In one embodiment of the present invention, the column body 41 is a threaded column structure, and the corresponding hole 81 of the storage device 80 is a corresponding threaded hole, but the present invention is not limited to this embodiment. The column body 41 connects to the stopping portion 43, and the buffer element 42 is disposed around the column body 41. The buffer element 42 is arranged between the stopping portion 43 and the storage device 80 when the engaging member 40 is fixed on the storage device 80. The buffer element 42 could be made of an elastic material, such as foam or rubber, thereby providing the storage device 80 an elastic buffering effect after the storage device 80 being assembled.

Through the structure design of the column body 41 (for example, let the cross-section diameter of the column body 41 near the stopping portion 43 larger than the aperture size of the buffer element 42), a gap is kept between the buffer element 42 and the stopping portion 43 when the buffer element 42 is disposed around the column body 41, thereby facilitating the engaging member 40 to slip into the corresponding trough aperture 12, as shown in FIG. 1 and FIG. 2. Wherein, the cross-section diameter of the column body 41 is smaller than the groove width of the extension groove 122, and the cross-section diameter of the stopping portion 43 is between the aperture size of the through hole 121 and the groove width of the extension groove 122. Therefore, the column body 41 could move along the extension groove 122, and the engaging member 40 could be prevented from leaving the extension groove 122 by the stopping portion 43.

Figure 3A:
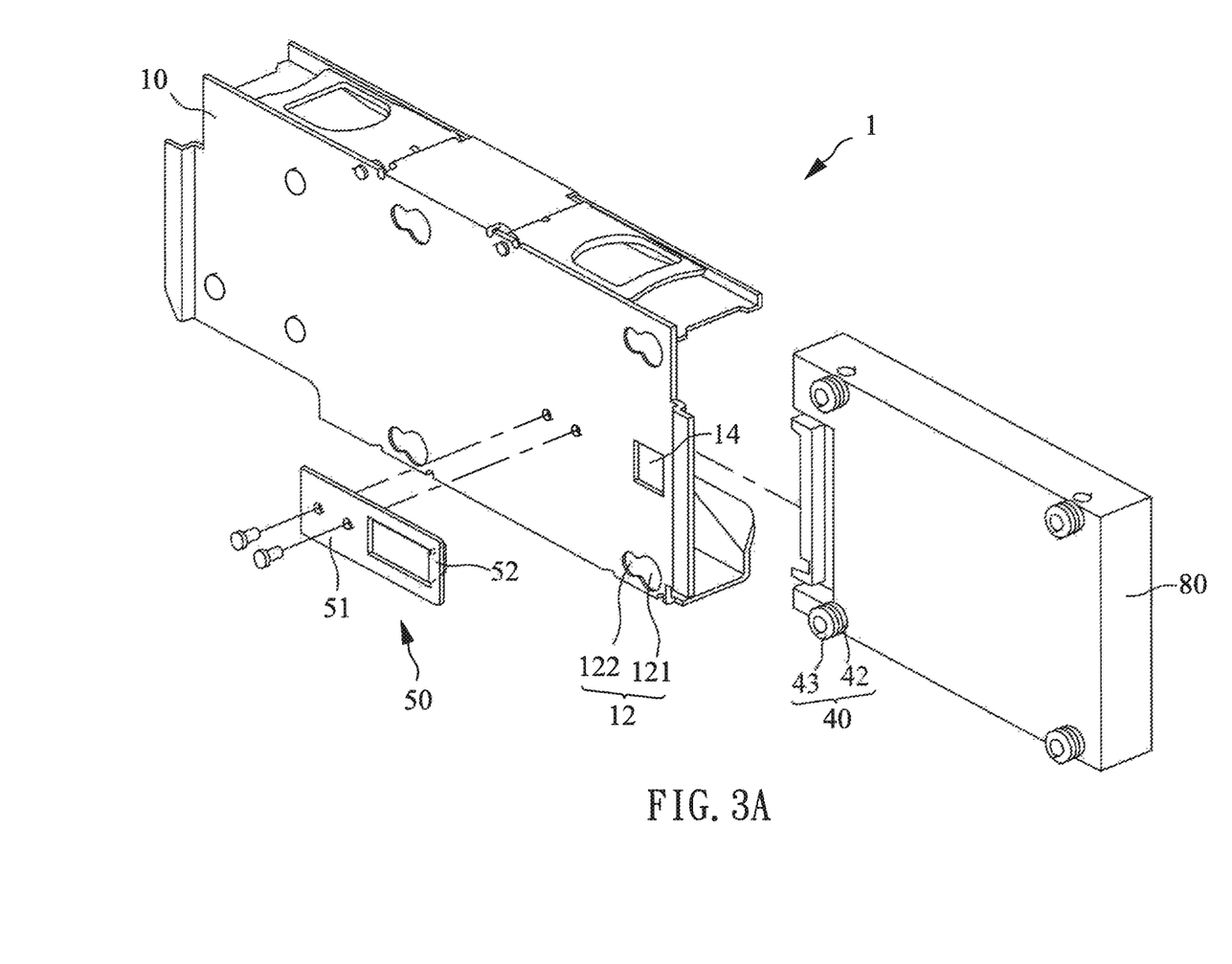
FIG. 3A is a schematic diagram of the first embodiment according to the storage device assembling module of the present invention before assembling the storage device.
Figure 3B:
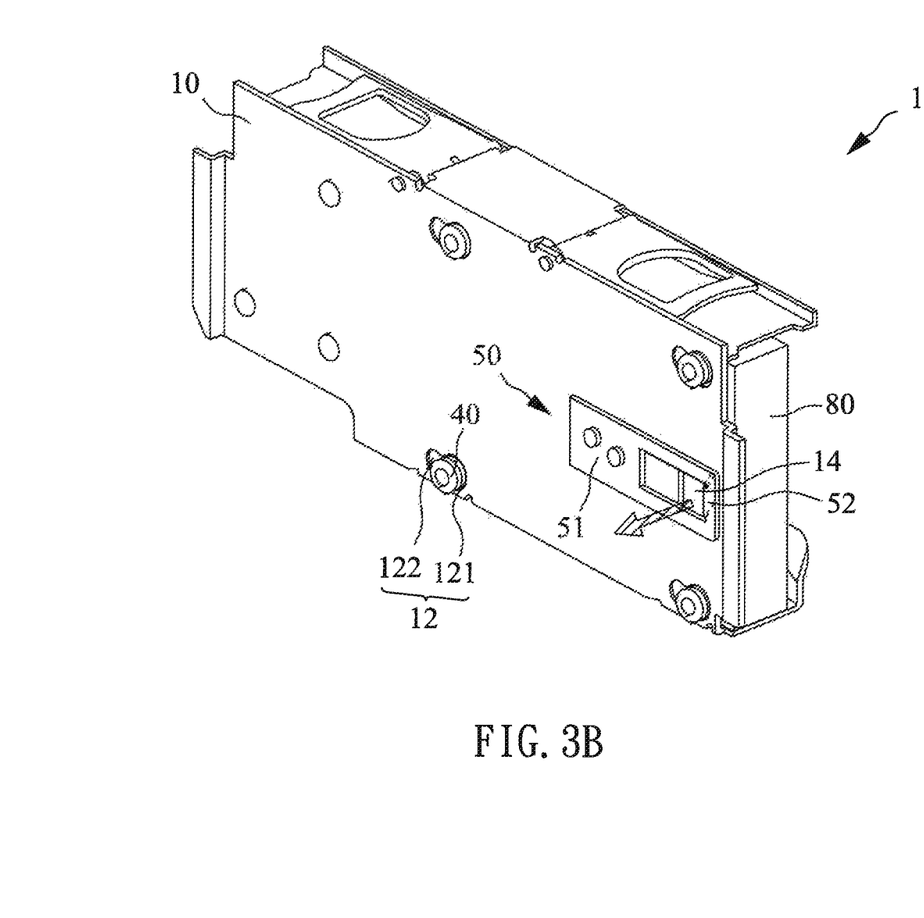
FIG. 3B is a schematic diagram of the first embodiment according to the storage device assembling module of the present invention during assembling the storage device.
Figure 3C:
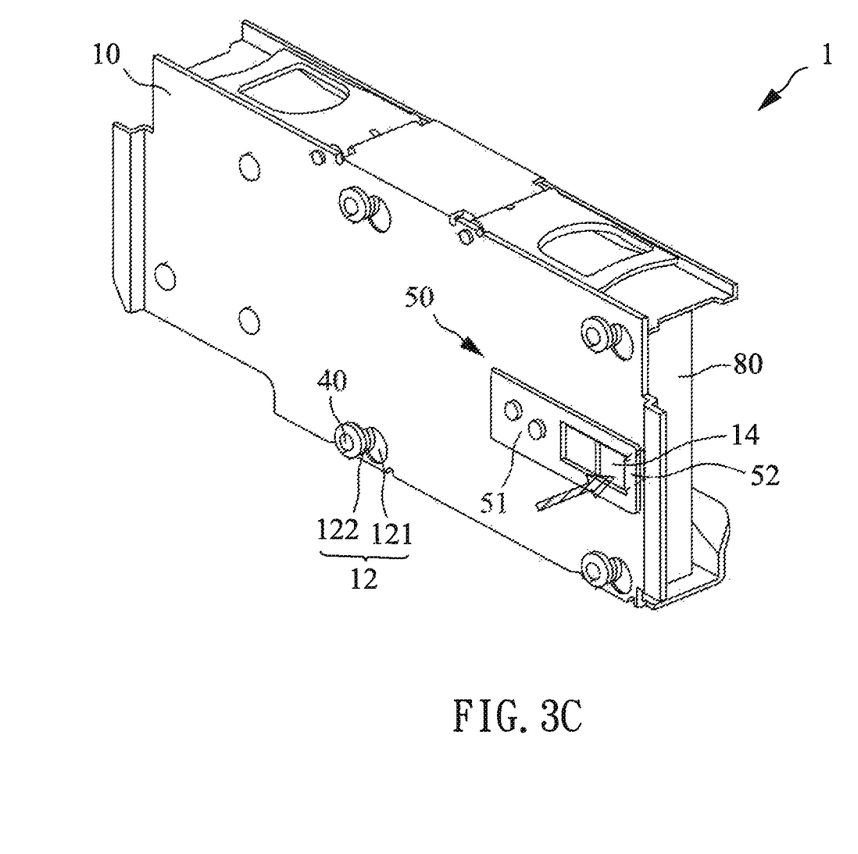
FIG. 3C is a schematic diagram of the first embodiment according to the storage device assembling module of the present invention after assembling the storage device.
Figure 3D:
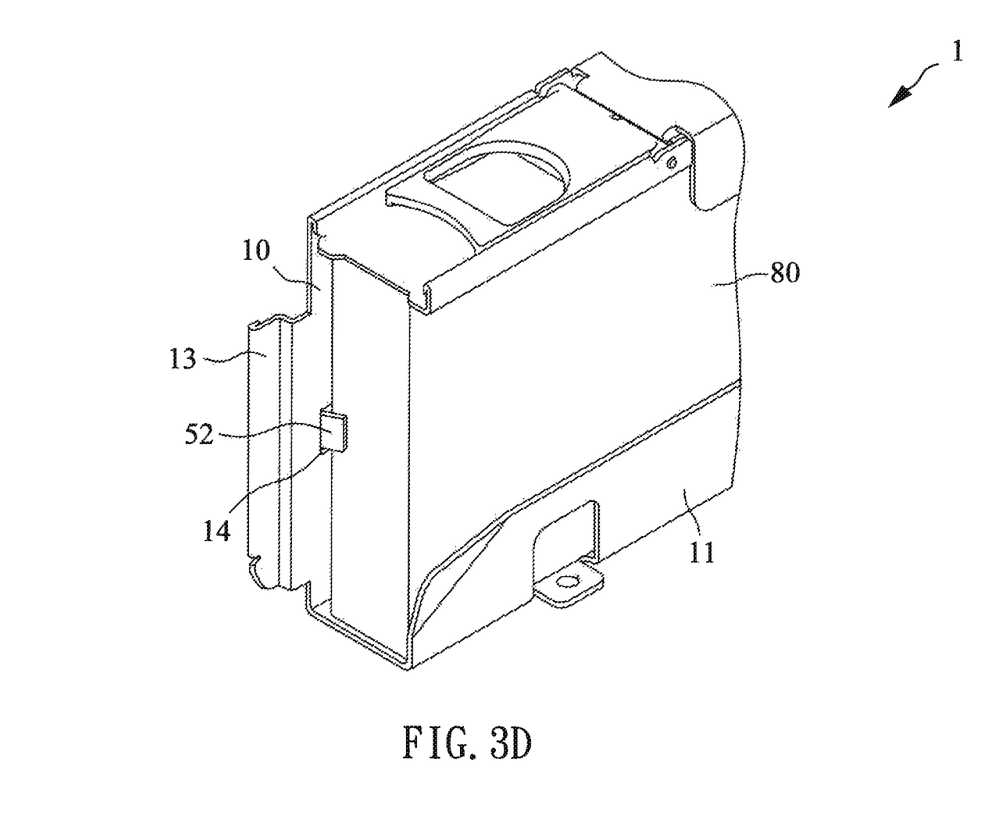
FIG. 3D is a schematic diagram of the first embodiment according to the storage device assembling module of the present invention with another view angle after assembling the storage device.

Please refer to FIG. 3A to FIG. 3D. FIG. 3A is a schematic diagram of the first embodiment according to the storage device assembling module 1 of the present invention before assembling the storage device 80. FIG. 3B is a schematic diagram of the first embodiment according to the storage device assembling module 1 of the present invention during assembling the storage device 80. FIG. 3C is a schematic diagram of the first embodiment according to the storage device assembling module 1 of the present invention after assembling the storage device 80. FIG. 3D is a schematic diagram of the first embodiment according to the storage device assembling module 1 of the present invention with another view angle after assembling the storage device 80.

As shown in FIG. 3A, in this embodiment, before assembling the storage device 80 on the storage device assembling module 1, the engaging members 40 need to be fastened in the corresponding holes of the storage device 80 first, and a gap is kept between each buffer element 42 of the engaging member 40 and the stopping portion 43, thereby assembling and fixing the storage device 80.

As shown in FIG. 3B, the storage device 80 slips correspondingly into the chute structure 11 of the main frame 10, till the plurality of engaging member 40 fixed on the storage device 80 are corresponding to the positions of the plurality apertures 12, and then the through hole 121 of the apertures 12 is penetrated correspondingly by the stopping portion 43 of each engaging member 40. During assembling the storage device 80, due to the positioning portion 52 of the positioning structure 50 having an inclined plane structure, when the storage device 80 moves, the storage device 80 would push the positioning portion 52 protruded out of the opening 14 by the inclined plane structure. The positioning structure 50 would swing toward the direction away from the main frame 10 by the fixing portion 51 as a fulcrum so as to remove the positioning portion 52 from the opening 14 without affecting the assembling of the storage device 80.

As shown in FIG. 3C, after the stopping portion 43 of each engaging member 40 passing through the through hole 121, the storage device 80 could be moved toward the slip-in direction aforementioned, and thus each engaging member 40 could be moved along the extension groove 122 of the corresponding aperture 12 to the end of the extension groove 122. Therefore, a stopping effect is formed by the stopping portion 43 of each engaging member 40 and the main frame 10 located outside of the extension groove 122, thereby fastening the storage device 80 on the main frame 10 firmly. After the storage device 80 slipping into a predetermined position, the connection interface 82 of the storage device 80 could be connected to the first connecting port 21 of the adapter 20.

As further shown in FIG. 3C and FIG. 3D, the positioning portion 52 of the positioning structure 50 is not pushed by the storage device 80. By the elastic recovery force of the positioning portion 52, the positioning portion 52 swings back toward the main frame 10 by the fixing portion 51 as the fulcrum. The positioning structure 50 penetrates the opening 14 of the main frame 10 again to return to the original protruding position, so as to fixed the back of the storage device 80. Accordingly, the positioning portion 52 of the positioning structure 50 could provide an assistant positioning effect for preventing the storage device 80 to move backward and falling off.

Contrarily, when detaching the storage device 80 relative to the main frame 10, a force needs to be applied on the positioning portion 52 of the positioning structure 50 first to make the positioning portion 52 swings toward the direction away from the main frame 10 by the fixing portion 51 as the fulcrum and leave the opening 14; then the back moving limitation of the storage device 80 can be removed. Next, moving the storage device 80 along the reverse direction of the storage device 80 slipping into the chute structure 11, and each engaging member 40 can be moved from the extension groove 122 to the through hole 121 of the corresponding aperture 12 and left the through hole 121. Accordingly, the storage device 80 can be continually moved along the reverse direction of the storage device 80 slipping into the chute structure 11 until the storage device 80 slips out the chute structure 11.

In addition, as further shown in FIG. 1, the main frame 10 further comprises at least two guiding track structures 13. In this embodiment, two guiding track structures 13 are respectively disposed on two opposite sides of the main frame 10. By the two guiding track structures 13, the main frame 10 could be fixed on the circuit board 210 movably.

Figure 4A:
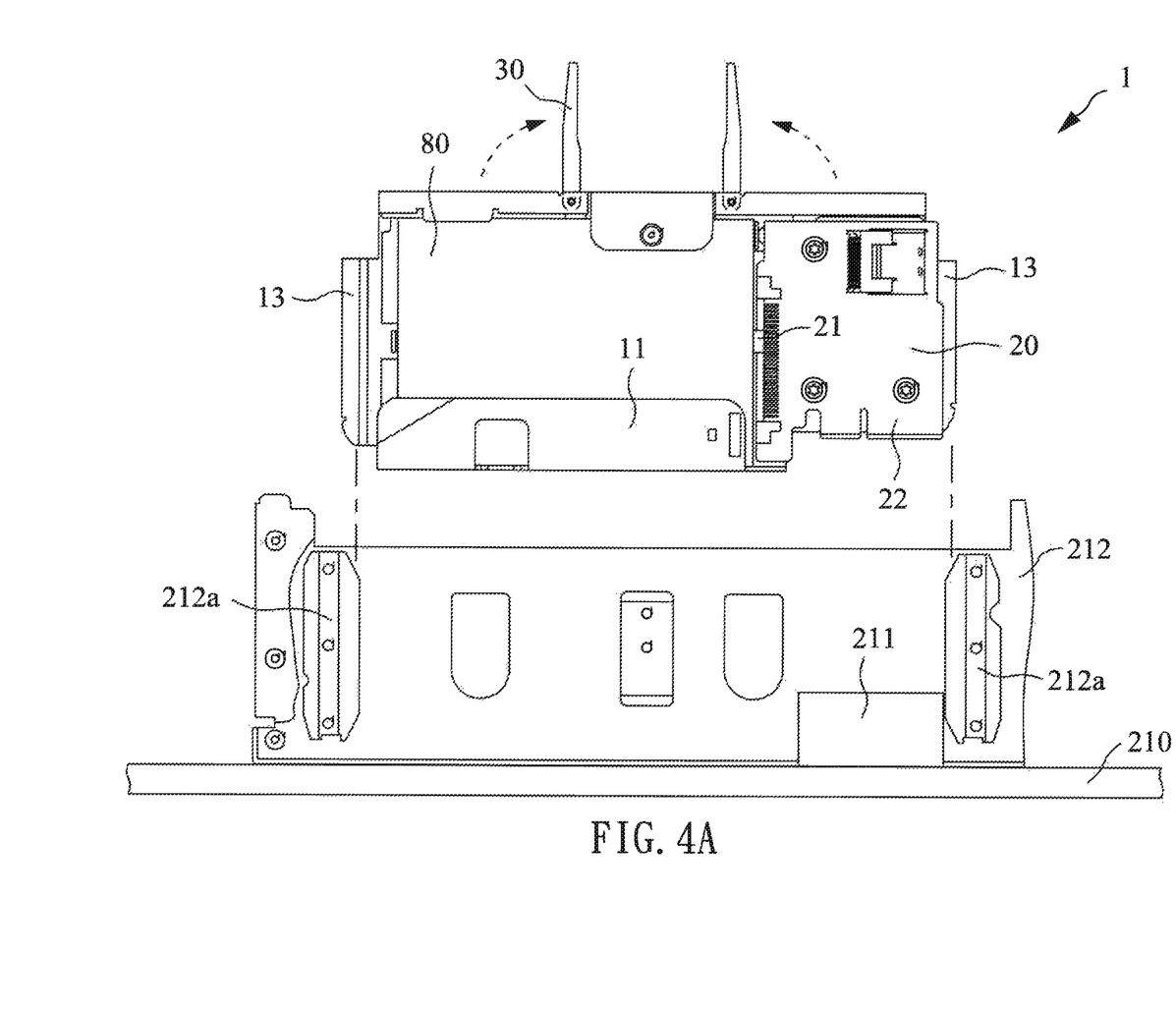
FIG. 4A is a schematic diagram of the first embodiment according to the storage device assembling module of the present invention before assembling a circuit board.
Figure 4B:
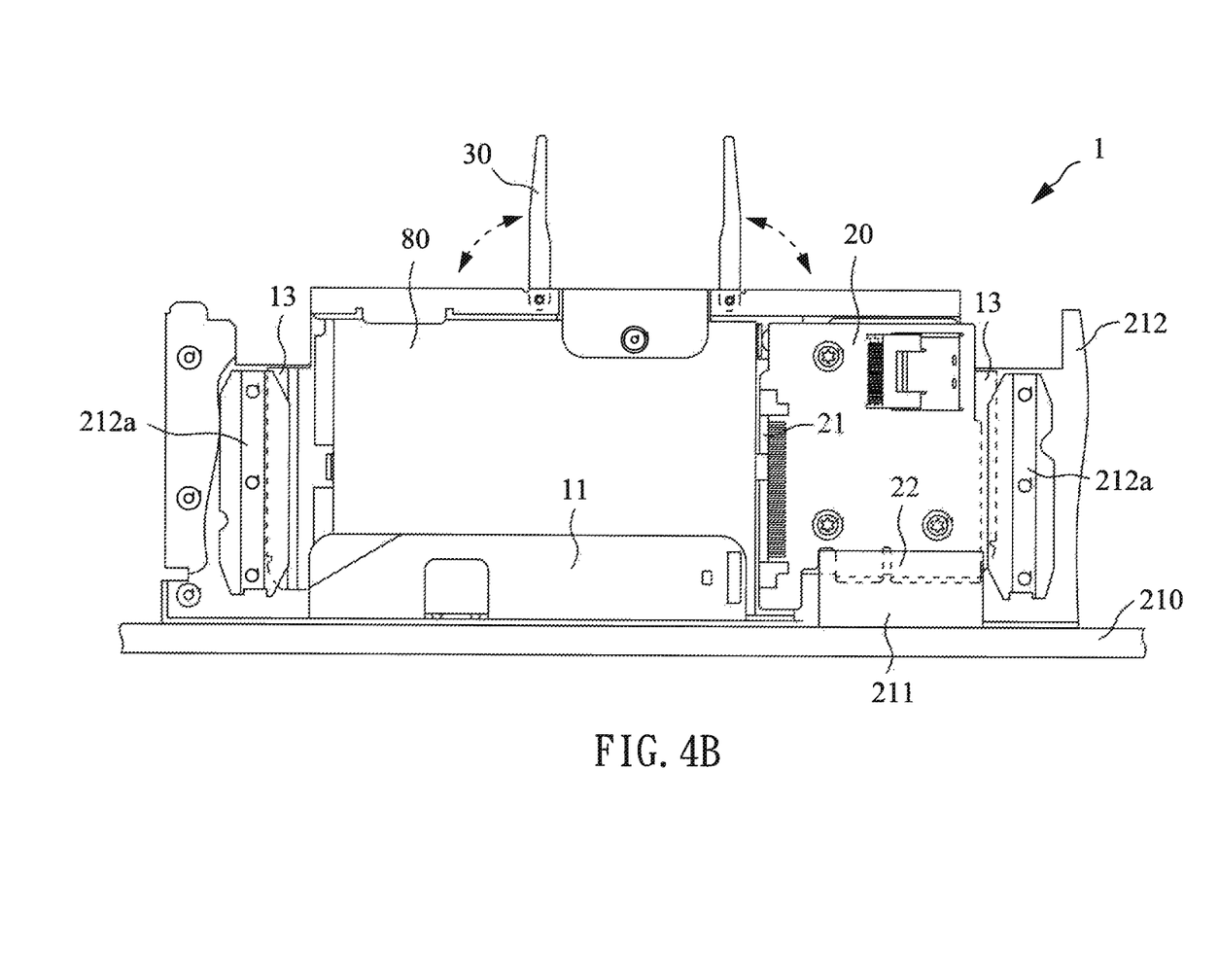
FIG. 4B is a schematic diagram of the first embodiment according to the storage device assembling module of the present invention after assembling the circuit board.

Following please refer to FIG. 4A to FIG. 4B. FIG. 4A is a schematic diagram of the first embodiment according to the storage device assembling module 1 of the present invention before assembling the circuit board. FIG. 4B is a schematic diagram of the first embodiment according to the storage device assembling module 1 of the present invention after assembling the circuit board.

As shown in FIG. 4A, the storage device assembling module 1 of the present invention merely uses the second connecting port 22 of the adapter 20 to be inserted in the corresponding interface 211 of the circuit board 210. In order to increase the assembling stability of the storage device assembling module 1 of the present invention, a support member 212 could be disposed on the circuit board 210, and corresponding guiding track structures 212a are disposed on the support member 212. The disposed positions of the corresponding guiding track structures 212a are corresponding to the two guiding track structures 13 of the main frame 10. When the storage device assembling module 1 of the present invention is assembled on the circuit board 210, the user could aim the second connecting port 22 of the adapter 20 at the corresponding interface 211 of the circuit board 210 to realize the substantially perpendicularly inserting connection. At the same time, the two guiding track structures 13 of the main frame 10 can be slipped into the corresponding guiding track structures 212a of the support member 212, as shown in FIG. 4B. An assistant fixing effect is provided to the storage device assembling module 1 of the present invention.

Contrarily, when the user want to detach the storage device assembling module 1 of the present invention from the circuit board 210, he or she can rotate the handgrip 30 relative to the main frame 10 to the direction which is substantially parallel to the connection direction of the second connecting port 22 (or substantially perpendicular to the direction of the circuit board 210), and then pull the handgrip 30 toward the reverse direction of the connection direction of the second connecting port 22. The second connecting port 22 can be substantially perpendicularly detached from corresponding interface 211 of the circuit board 210. The two guiding track structures 13 of the main frame 10 further slip out the corresponding guiding track structures 212a of the support member 212, and the detaching operation of the storage device assembling module 1 of the present invention is completed.

Figure 5:
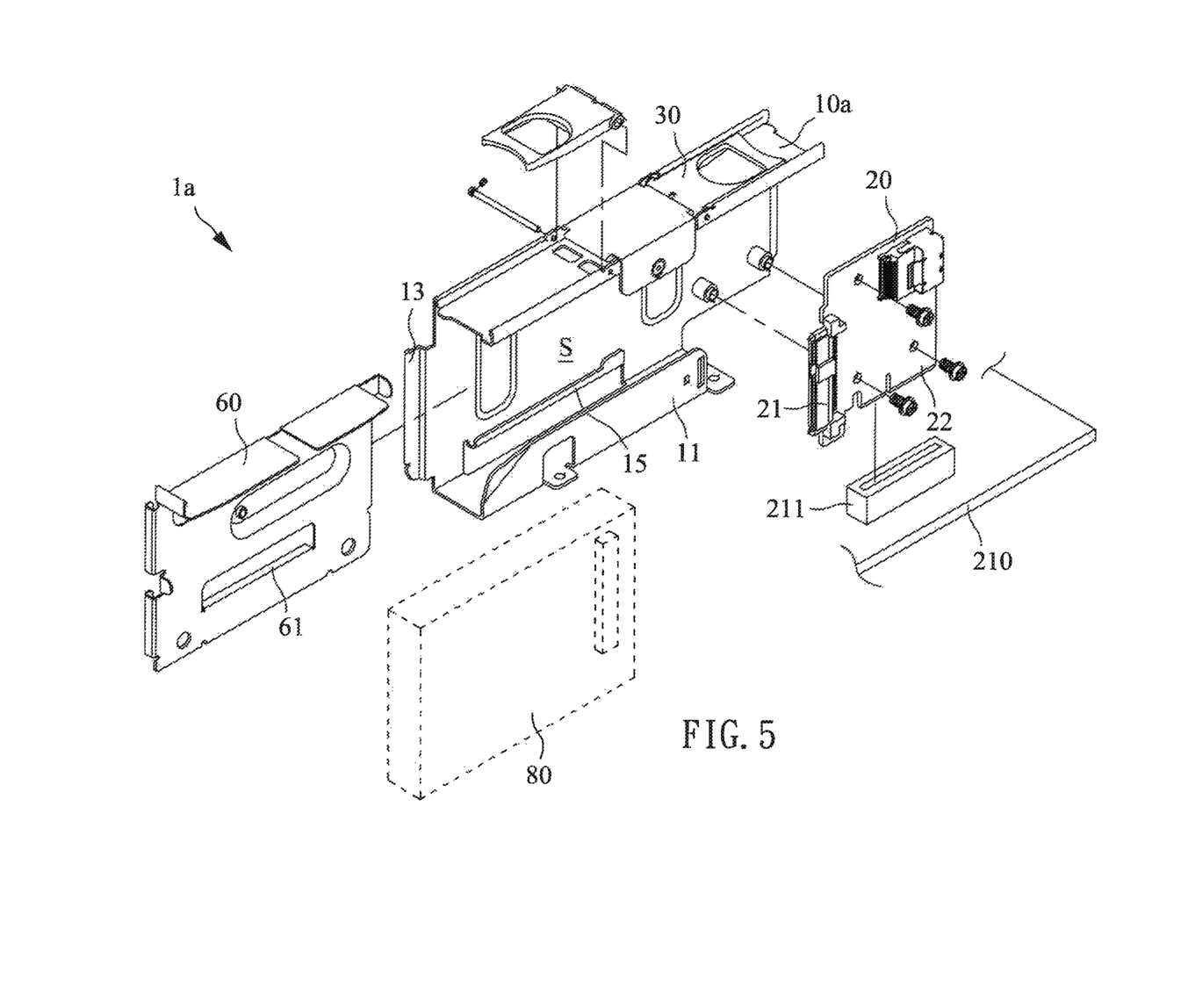
FIG. 5 is a structure explosion diagram of a second embodiment according to the storage device assembling module of the present invention.

Please refer to FIG. 5, which is a structure explosion diagram of a second embodiment according to the storage device assembling module 1a of the present invention.

The present embodiment is a variant of the aforementioned first embodiment. As shown in FIG. 5, except the main frame 10a, the adapter 20 and the at least one handgrip 30, the storage device assembling module 1a of the present invention further comprises an assistant frame 60. The assistant frame 60 is for pre-accommodating and fixing the storage device 80, and a size of the assistant frame 60 corresponds to the chute structure 11 of the main frame 10a. The assistant frame 60 could be detachably combined to the main frame 10a along the chute structure 11. Like the first embodiment, the same main frame 10a combined with the assistant frame 60 could be applied to the storage devices 80 with different thickness size. In this embodiment, the plurality of engaging members 40, screwed-fastening members (screws) or other members with the similar fixing effect could be used on the storage devices 80, thereby fixing the storage devices 80 on the assistant frame 60, but the present invention is not limited to it.

Wherein the main frame 10a further includes an inner guiding track structure 15 disposed in the chute structure 11a, for providing assistant fixing effect and moving stability of the assistant frame 60 when slipping into the chute structure 11a.

Figure 6:
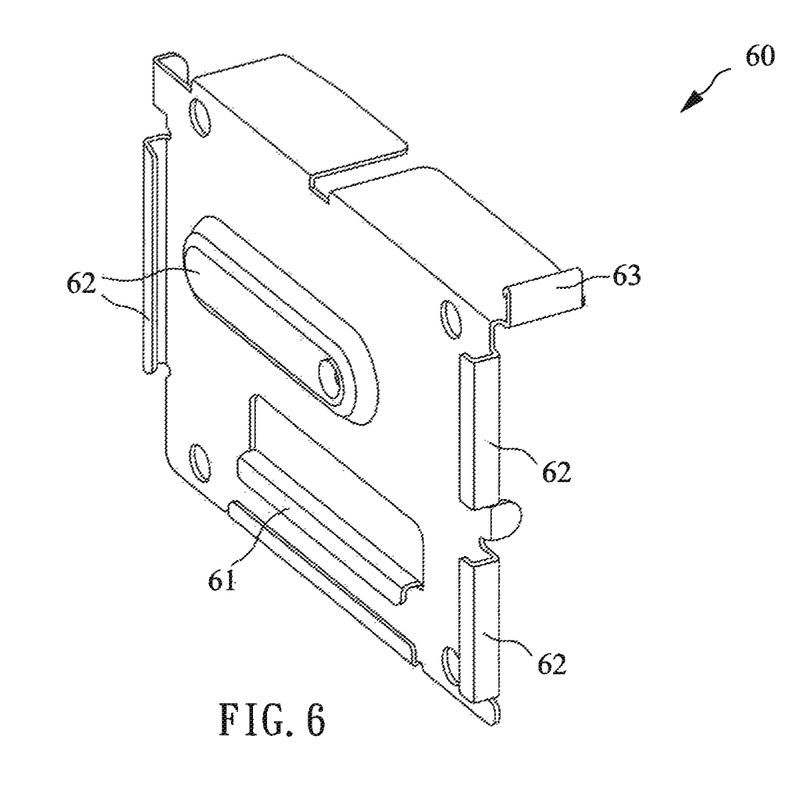
FIG. 6 is a schematic diagram of an assistant frame according to the second embodiment of the storage device assembling module of the present invention.

Please refer to FIG. 6, which is a schematic diagram of an assistant frame according to the second embodiment of the storage device assembling module of the present invention.

As shown in FIG. 5 and FIG. 6, the assistant frame 60 includes a corresponding inner guiding track structure 61, and a structure type and a disposing position of the corresponding inner guiding track structure 61 are corresponding to the inner guiding track structure 15 of the main frame 10a. Thus, when the assistant frame 60 slips into the chute structure 11, the corresponding inner guiding track structure 61 would move along the inner guiding track structure 15, so as to increase the moving stability of the assistant frame 60.

The assistant frame 60 further comprises at least one cushion element 62, each cushion element 62 protrudes from the assistant frame 60 toward one surface of the main frame 10a, thereby increasing the distance between the main frame 10a and the assistant frame 60. Because engaging elements or screwed-fixing elements are needed to fix the storage devices 80 on the assistant frame 60, the possibility of affecting the assistant frame 60 slipping into the chute structure 11 by these elements can be prevented through the design of the at least one cushion element 62. In this embodiment, each cushion element 62 could be designed as a bending structure disposed at the periphery of the assistant frame 60, or a convex lump structure inside the assistant frame 60. A corresponding structure of the main frame 10a could be designed to collocate with the aforementioned bending structure, thereby providing a position limiting function when the assistant frame 60 is moving.

In addition, the assistant frame 60 further comprises an operation portion 63 disposed also on one side edge of the assistant frame 60, for providing a function of pull out the assistant frame 60 from the chute structure 11. The user could apply force on the operation portion 63 along the reverse direction of the assistant frame 60 slipping into the chute structure 11, and thus the assistant frame 60 could slip out of the chute structure 11.

Figure 7:
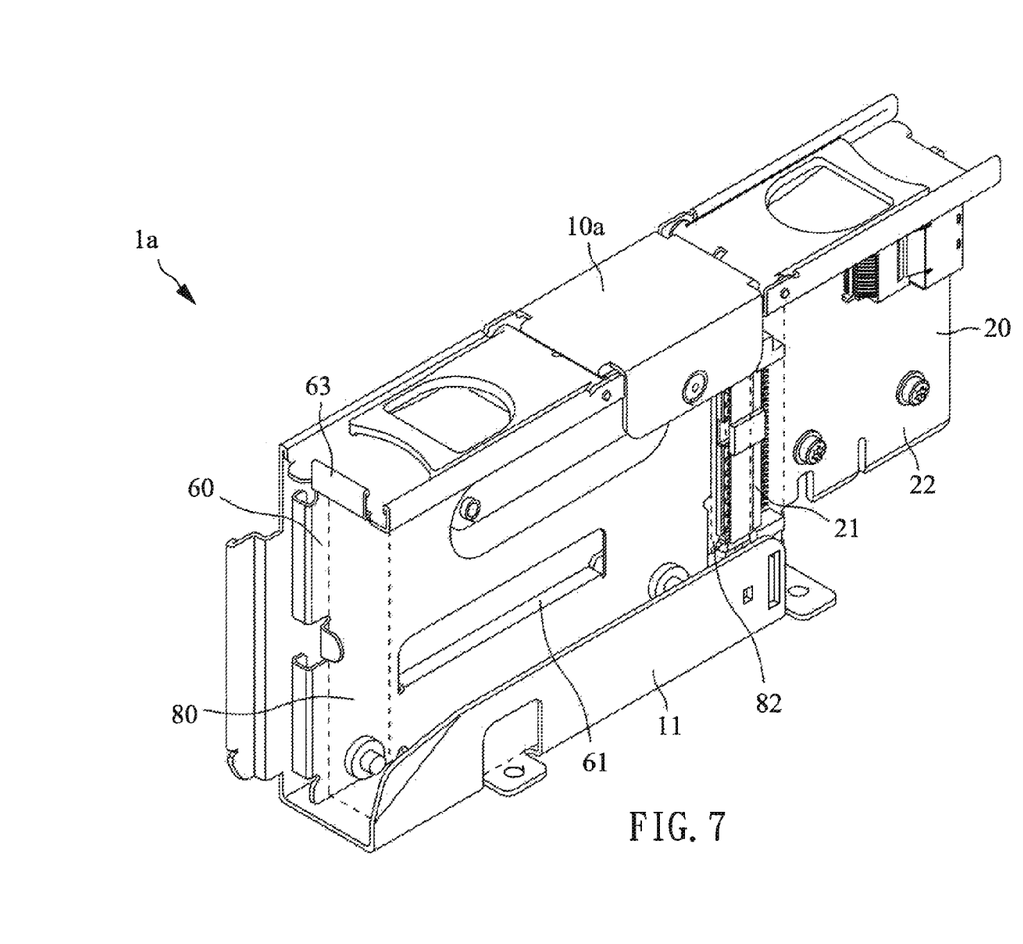
FIG. 7 is a schematic diagram of a second embodiment according to the storage device assembling module of the present invention after the assistant frame combining with a main frame.

Please refer to FIG. 7, which is a schematic diagram of a second embodiment according to the storage device assembling module 1a of the present invention after the assistant frame 60 combining with a main frame 10a.

As shown in FIG. 7, after the assistant frame 60 slipping to the predetermined position in the chute structure 11, the connection interface 82 of the storage device 80 (the dot line in the figure) would directly connect to the first connecting port 21 of the adapter 20. At this moment, the assistant frame 60 is located in the chute structure 11 except the operation portion 63. The operation portion 63 is located outside the chute structure 11, for providing a position-limiting function when the assistant frame 60 slipping into the chute structure 11. On the other hand, the operation portion 63 further provides a portion for the user to apply force on; when the user applies force on the operation portion 63 along the reverse direction of the assistant frame 60 slipping into the chute structure 11, the connection interface 82 of the storage device 80 would thus be detached from the first connecting port 21 of the adapter 20, so as to detach the assistant frame 60.

Figure 8:
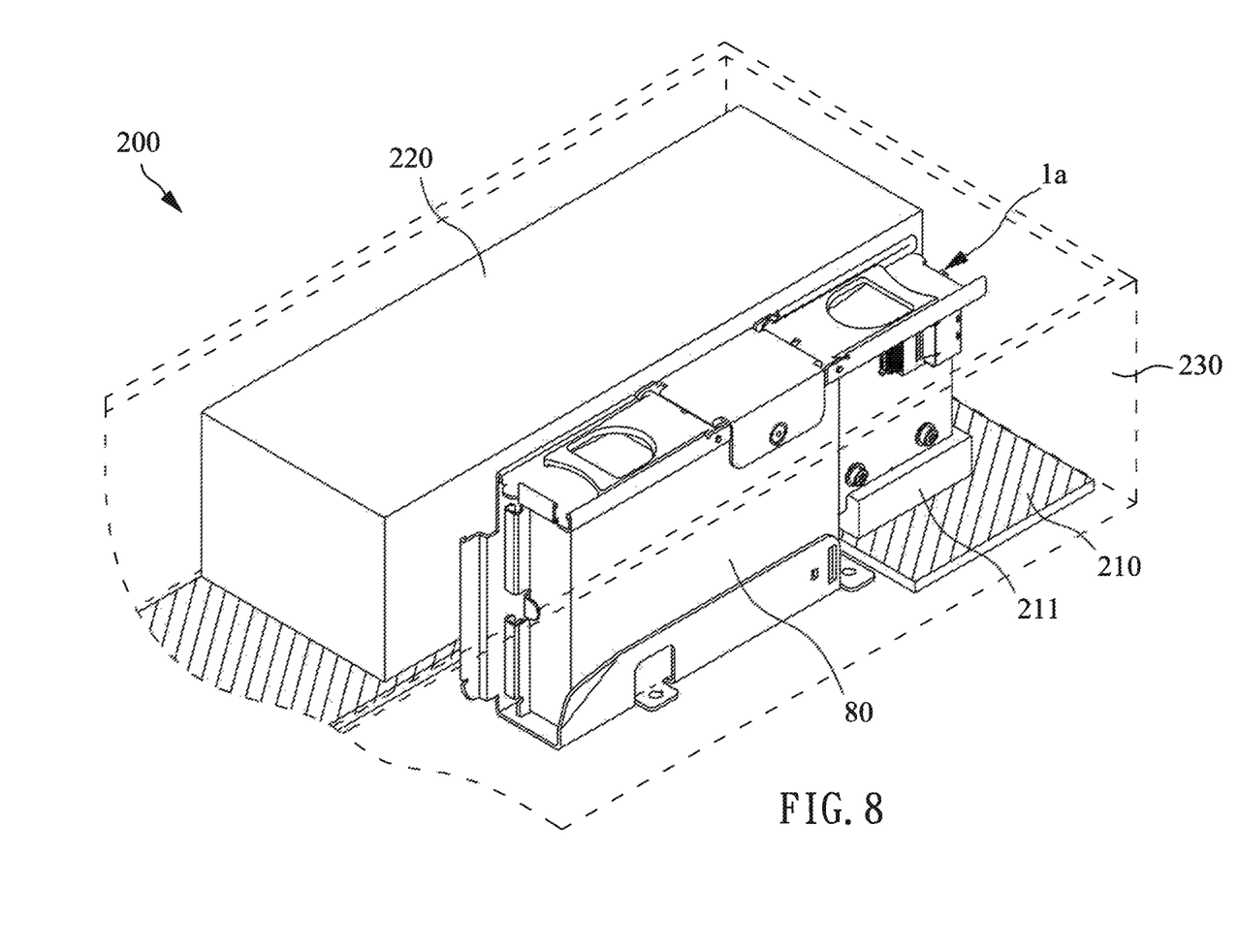
FIG. 8 is a schematic diagram of an electronic apparatus using the second embodiment of the storage device assembling module of the present invention.

Please refer to FIG. 8, which is a schematic diagram of an electronic apparatus 200 using the second embodiment of the storage device assembling module 1a of the present invention.

In order to more clearly interpret the effect and the practicability generated by the structure design of the storage device assembling module 1a according to the present invention, please refer to FIG. 8, a second structure embodiment of the aforementioned storage device assembling module 1a applied to the electronic apparatus 200 is taken as an example and interpreted. However, the present invention is not limited to it, the first embodiment of the aforementioned storage device assembling module 1 could also be used to replace it.

As shown in FIG. 8, the electronic apparatus 200 comprises a casing 230, a circuit board 210 and at least one storage device assembling module 1a aforementioned (only one storage device assembling module 1a is shown in this figure). The storage device assembling module 1a is provided to accommodate the storage device 80. The circuit board 210, the storage device 80 and the storage device assembling module 1a are assembled in the casing 230, and the circuit board 210 includes at least one corresponding interface 211 (only one corresponding interface 211 is shown in the figure and the corresponding interface 211 is a connector). The storage device 80 could be electrically connected to the circuit board 210 by the corresponding interface 211.

In an electronic apparatus 200 such as in a casing 230 of a rack mount server, under the situation that the width and the height of the casing 230 are limited, and some objects such as power management devices or heat dissipating devices are assembled in the casing 230, the space for assembling the storage device assembling module 1a inside the casing 230 is restricted. Through the structure design of the storage device assembling module 1a according to the present invention, the storage device 80 could be assembled substantially perpendicularly relative to the circuit board 210 in the casing 230 but with a assembling direction substantially parallel to the circuit board 210, and the storage device 80 still could be electrically connected to the circuit board 210. By the vertical assembling type of the storage device assembling module 1a according to the present invention, the space in the casing 230 could be effectively used and planned. Also as shown in the figures, when the user needs to pull out the storage device 80 or repair the circuit board 210, he or she only needs to open the top cover of the casing 230 and turn the handgrip 30 of the storage device assembling module 1a up, and then the storage device assembling module 1a could be pulled out of the circuit board 210 as described above. The effect of toolless plugging-in/out could be achieved on as to raise the convenience of the assembling.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A storage device assembling module, for assembling a storage device in an electronic apparatus and connecting electrically the storage device to a circuit board of the electronic apparatus, the storage device having a connecting interface the storage device assembling module comprising: a main frame, including a chute structure forming a receiving space for receiving the storage device along a first direction and positioning the storage device; an adapter, combining with the main frame and including a first connecting port connected electrically to the connecting interface of the storage device in a face-to-face manner coplanar along the first direction and a second connecting port connected electrically to the circuit board along a second direction, the first connecting port being positioned at a location adjacent to the chute structure, wherein the first direction is substantially perpendicular to the second direction and at least one handgrip, each handgrip being connected to a side of the main frame which is opposite and away from the circuit board in the second direction, and the storage device assembling module could be substantially perpendicularly detached from the circuit board by pulling the at least one handgrip along the second direction.

2. The storage device assembling module of claim 1, wherein the main frame further includes a plurality of apertures, each aperture includes a through hole and an extension groove communicated with the through hole, and an aperture size of the through hole is lager than a groove width of the extension groove.

3. The storage device assembling module of claim 2, further comprising a plurality of engaging member corresponding to the positions of the plurality of apertures thereby being fixed on the storage device, each engaging member including a column body, a buffer element and a stopping portion, the column body connecting to the stopping portion, and the buffer element being disposed around the column body and keeping a gap with the stopping portion, wherein a cross-section diameter of the column body is smaller than the groove width of the extension groove, and a cross-section diameter of the stopping portion is between the aperture size of the through hole and the groove width of the extension groove.

4. The storage device assembling module of claim 2, further comprising a positioning structure, the positioning structure including a fixing portion and a positioning portion, the fixing portion connecting to the main frame, the positioning portion being located at an opening of the main frame and using the fixing portion as a fulcrum to elastic swing relative to the main frame thereby protruding from the opening or exiting the opening when being applied force externally.

5. The storage device assembling module of claim 4, wherein the positioning portion is an inclined plane structure, when the storage device slips along the first direction into the chute structure the inclined plane structure would following be pushed by the storage device, thereby the positioning portion in the opening swings toward a direction away from the main frame and exits the opening.

6. The storage device assembling module of claim 1, wherein a thickness of the receiving space is not less than the thickness of the storage device.

7. The storage device assembling module of claim 1, further comprising an assistant frame, for fastening the storage device and being detachably disposed on the main frame along the chute structure.

8. The storage device assembling module of claim 7, wherein the main frame further comprises an inner guiding track structure disposed in the chute structure, and the assistant frame comprises a corresponding inner guiding track structure; when the assistant frame slips along the first direction into the chute structure, the corresponding inner guiding track structure moves along the inner guiding track structure.

9. The storage device assembling module of claim 7, wherein the assistant frame comprises at least one cushion element, which protrudes from the assistant frame toward one surface of the main frame, and a distance between the main frame and the assistant frame is increased by the at least one cushion element.

10. The storage device assembling module of claim 7, wherein the assistant frame comprises an operation portion, and by applying force along a direction opposite to the first direction on the operation portion, the assistant frame slips out of the chute structure.

11. The storage device assembling module of claim 1, wherein the main frame further comprises at least two guiding track structures disposed respectively on opposite sides of the main frame along the second direction, for slipping and fixing the main frame on a support member of the circuit board.

12. An electronic apparatus, comprising: a casing; at least one storage device with a connecting interface; a circuit board, disposed in the casing and including at least one connector; and at least one storage device assembling module, each storage device assembling module being substantially perpendicularly disposed on the circuit board to accommodate each storage device thereby electrically connecting each storage device to the circuit board, each storage device assembling module comprising: a main frame, including a chute structure forming a receiving space for receiving, the storage device along a first direction and positioning the storage device; an adapter, combining with the main frame and including a first connecting port connected electrically to the connecting interface of the storage device in a face-to-face manner coplanar along the first direction and a second connecting port connected electrically to the connector of the circuit board along a second direction, the first connecting port being positioned at a location adjacent to the chute structure; wherein the first direction is substantially perpendicular to the second direction, and the first direction is substantially parallel to the circuit board; and at least one handgrip, each handgrip being connected to a side of the main frame which is opposite and away from the circuit board in the second direction, and the storage device assembling module could be substantially perpendicularly detached from the circuit board by pulling the at least one handgrip along the second direction.

13. The electronic apparatus of claim 12, wherein the main frame further includes a plurality of apertures, each aperture includes a through hole and an extension groove communicated with the through hole, and an aperture size of the through hole is lager than a groove width of the extension groove.

14. The electronic apparatus of claim 13, further comprising a plurality of engaging member corresponding to the positions of the plurality of apertures thereby being fixed on the storage device, each engaging member including a column body, a buffer element and a stopping portion, the column body connecting to the stopping portion, and the buffer element being disposed around the column body and keeping a gap with the stopping portion, wherein a cross-section diameter of the column body is smaller than the groove width of the extension groove, and a cross-section diameter of the stopping portion is between the aperture size of the through hole and the groove width of the extension groove.

15. The electronic apparatus of claim 13, further comprising a positioning structure, the positioning structure including a fixing portion and a positioning portion, the fixing portion connecting to the main frame, the positioning portion being located at an opening of the main frame and using the fixing portion as a fulcrum to elastic swing relative to the main frame thereby protruding from the opening or exiting the opening when being applied force externally.

16. The electronic apparatus of claim 15, wherein the positioning portion is an inclined plane structure, when the storage device slips along the first direction into the chute structure the inclined plane structure would following be pushed by the storage device, thereby the positioning portion in the opening swings toward a direction away from the main frame and draw back in the opening.

17. The electronic apparatus of claim 12, wherein a thickness of the receiving space is not less than the thickness of the storage device.

18. The electronic apparatus of claim 12, further comprising an assistant frame, for fastening the storage device and being detachably disposed on the main frame along the chute structure.

19. The electronic apparatus of claim 18, wherein the main frame further comprises an inner guiding track structure disposed in the chute structure, and the assistant frame comprises a corresponding inner guiding track structure, when the assistant frame slips along the first direction into the chute structure, the corresponding inner guiding track structure moves along the inner guiding track structure.

20. The electronic apparatus of claim 18, wherein the assistant frame comprises at least one cushion height element, which protrudes from the assistant frame toward one surface of the main frame, and the distance between the main frame and the assistant frame is increased by the cushion height element.

21. The electronic apparatus of claim 18, wherein the assistant frame comprises an operation portion, and by applying force along a direction opposite to the first direction on the operation portion, the assistant frame slips out of the chute structure.

22. The electronic apparatus of claim 12, wherein the main frame further comprises at least two guiding track structure disposed respectively on the opposite sides of the main frame along the second direction, for slipping and fixing the main frame on a support member of the circuit board.

* * * * *